United States Patent
Zeng

(10) Patent No.: US 10,621,450 B2
(45) Date of Patent: Apr. 14, 2020

(54) ROAD SHOULDER EXTRACTION

(71) Applicant: TENCENT TECHNOLOGY (SHENZHEN) COMPANY LIMITED, Shenzhen (CN)

(72) Inventor: Chao Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 136 days.

(21) Appl. No.: 15/993,320

(22) Filed: May 30, 2018

(65) Prior Publication Data

US 2018/0276483 A1    Sep. 27, 2018

Related U.S. Application Data

(63) Continuation of application No. PCT/CN2017/095561, filed on Aug. 2, 2017.

(30) Foreign Application Priority Data

Aug. 22, 2016  (CN) .......................... 2016 1 0704055

(51) Int. Cl.
*G06K 9/00* (2006.01)
*G06T 7/521* (2017.01)
*G06T 7/13* (2017.01)

(52) U.S. Cl.
CPC ............ *G06K 9/00798* (2013.01); *G06T 7/13* (2017.01); *G06T 7/521* (2017.01);
(Continued)

(58) Field of Classification Search
None
See application file for complete search history.

(56) References Cited

U.S. PATENT DOCUMENTS

| 9,870,437 | B2* | 1/2018 | Pope ................... G06F 17/5004 |
| 2011/0164037 | A1* | 7/2011 | Yoshida .................. G06T 15/08 |
| | | | 345/419 |
| 2016/0026184 | A1* | 1/2016 | Stainvas Olshansky .................... |
| | | | G01S 17/936 |
| | | | 356/4.01 |

FOREIGN PATENT DOCUMENTS

| CN | 101914890 | 12/2010 |
| CN | 103500338 | 1/2014 |

(Continued)

OTHER PUBLICATIONS

Guan, H.—"Using mobile laser scanning data for automated extraction of road markings"—ISPRS 2014, pp. 93-107 (Year: 2014).*

(Continued)

*Primary Examiner* — Bernard Krasnic
(74) *Attorney, Agent, or Firm* — Oblon, McClelland, Maier & Neustadt, L.L.P.

(57) ABSTRACT

In a road shoulder extraction method, three-dimensional scan data of a plurality of frames is obtained. At least one high spatial point in the three-dimensional scan data of the plurality of frames is removed, to obtain three-dimensional scan data sets of the plurality of frames. A search is performed for a curvature change point and an elevation change point in each of the three-dimensional scan data sets of the plurality of frames. A search is performed for a road shoulder location point in the three-dimensional scan data set of each of the plurality of frames according to the curvature change point and the elevation change point in the three-dimensional scan data set of the respective frame. The road shoulder location point in the three-dimensional scan data set of each of the plurality of frames is extracted according to a preset algorithm. The extracted road shoulder location points are connected to obtain a road shoulder line.

16 Claims, 4 Drawing Sheets

(52) U.S. Cl.
CPC ..... *G06K 9/00201* (2013.01); *G06K 2209/40* (2013.01); *G06T 2200/04* (2013.01); *G06T 2207/10028* (2013.01); *G06T 2207/30256* (2013.01)

(56) References Cited

FOREIGN PATENT DOCUMENTS

| | | |
|---|---|---|
| CN | 103711050 | 4/2014 |
| CN | 105336166 | 2/2016 |
| CN | 105627938 | 6/2016 |

OTHER PUBLICATIONS

International Search Report dated Oct. 26, 2017 in PCT/CN2017/095561 filed Aug. 2, 2017. (With English Translation).

\* cited by examiner

ROAD SHOULDER EXTRACTION

RELATED APPLICATION

This application is a continuation of International Application No. PCT/CN2017/095561, filed on Aug. 2, 2017, which claims priority to Chinese Patent Application No. 201610704055.X, entitled "SHOULDER EXTRACTION METHOD AND APPARATUS" filed with the Patent Office of China on Aug. 22, 2016. The entire disclosures of the prior applications are hereby incorporated by reference in their entirety.

FIELD OF THE TECHNOLOGY

This application relates to the field of computer technologies, and shoulder extraction.

BACKGROUND OF THE DISCLOSURE

With the development of computer technologies and automation technologies, automated driving technologies have received much attention. The automated driving technologies are inseparable from the support of a high-accuracy map. How to generate a high-accuracy map has become one of the bottlenecks of automated driving. A shoulder, commonly known as a "curb", is a strip-shaped portion (including a hard shoulder and a protective shoulder) having a particular width and located between an outer edge of a roadway and a road base edge, for keeping the function of the roadway and temporary parking. The shoulder is also used as a lateral support of a road surface, and is an important constituent part of the road. High-accuracy shoulder data, used as an important constituent part of a high-accuracy map, is also particularly important.

SUMMARY

In view of this, examples of this application provide a shoulder extraction method and apparatus, and a storage medium, so that the accuracy of shoulder extraction can be improved.

In one embodiment, a road shoulder extraction method is provided. Three-dimensional scan data, generated by a laser scanner, of a plurality of frames is obtained by processing circuitry of a road shoulder extraction apparatus. At least one high spatial point in the three-dimensional scan data of the plurality of frames is removed by the processing circuitry, to obtain three-dimensional scan data sets of the plurality of frames. A search is performed by the processing circuitry for a curvature change point and an elevation change point in each of the three-dimensional scan data sets of the plurality of frames. A search is performed by the processing circuitry for a road shoulder location point in the three-dimensional scan data set of each of the plurality of frames according to the curvature change point and the elevation change point in the three-dimensional scan data set of the respective frame. The road shoulder location point in the three-dimensional scan data set of each of the plurality of frames is extracted by the processing circuitry according to a preset algorithm. The extracted road shoulder location points are connected to obtain a road shoulder line.

In one embodiment, a road shoulder extraction apparatus is provided. The road shoulder extraction apparatus includes processing circuitry that obtains three-dimensional scan data, generated by a laser scanner, of a plurality of frames. The processing circuitry removes at least one high spatial point in the three-dimensional scan data of the plurality of frames, to obtain a three-dimensional scan data sets of the plurality of frames. The processing circuitry searches for a curvature change point and an elevation change point in each of the three-dimensional scan data sets for the plurality of frames. Further, the processing circuitry searches for a road shoulder location point in the three-dimensional scan data set of each of the plurality of frames according to the curvature change point and the elevation change point in the three-dimensional scan data set of the respective frame. The processing circuitry extracts the road shoulder location point in the three-dimensional scan data set of each of the plurality of frames according to a preset algorithm and further connects the extracted road shoulder location points to obtain a road shoulder line.

In one embodiment, a non-transitory computer-readable storage medium storing instructions which when executed by at least one processor cause the at least one processor to perform a road shoulder extraction method is provided. Three-dimensional scan data, generated by a laser scanner, of a plurality of frames is obtained. At least one high spatial point in the three-dimensional scan data of the plurality of frames is removed, to obtain three-dimensional scan data sets of the plurality of frames. A search is performed for a curvature change point and an elevation change point in each of the three-dimensional scan data sets of the plurality of frames. A search is performed for a road shoulder location point in the three-dimensional scan data set of each of the plurality of frames according to the curvature change point and the elevation change point in the three-dimensional scan data set of the respective frame. The road shoulder location point in the three-dimensional scan data set of each of the plurality of frames is extracted according to a preset algorithm. The extracted road shoulder location points are connected to obtain a road shoulder line.

BRIEF DESCRIPTION OF THE DRAWINGS

To describe the technical solutions in the examples of this application more clearly, the following briefly introduces the accompanying drawings required for describing the examples. The accompanying drawings in the following description show some examples of this application, and a person skilled in the art may still derive other drawings from these accompanying drawings.

DESCRIPTION OF EMBODIMENTS

The following describes the technical solutions in the examples of this application with reference to the accompanying drawings in the examples of this application. The described examples are some of the examples of this application rather than all of the examples. All other examples obtained by a person skilled in the art based on the examples of this application shall fall within the protection scope of this application.

In some examples, shoulder extraction may be performed based on an image or video extraction method. That is, edge detection is first performed on an image or a video by using an edge detection method, to obtain an edge point set, and then hough transform line extraction or B spline-curve fitting is performed on the edge point set, to obtain a final shoulder line equation.

The foregoing method is sensitive to illumination. Under different illumination conditions, the gradient difference of a shoulder on an image is relatively large, easily causing errors and omissions in extraction. In addition, the accuracy of the foregoing method is not high. According to the method, three-dimensional curb information is extracted from a two-dimensional image, and a road surface is usually regarded as a plane. However, an actual road surface is usually not a plane. Consequently, the extraction accuracy is not high, and cannot meet the accuracy requirement of a high-accuracy map.

Figure 1:
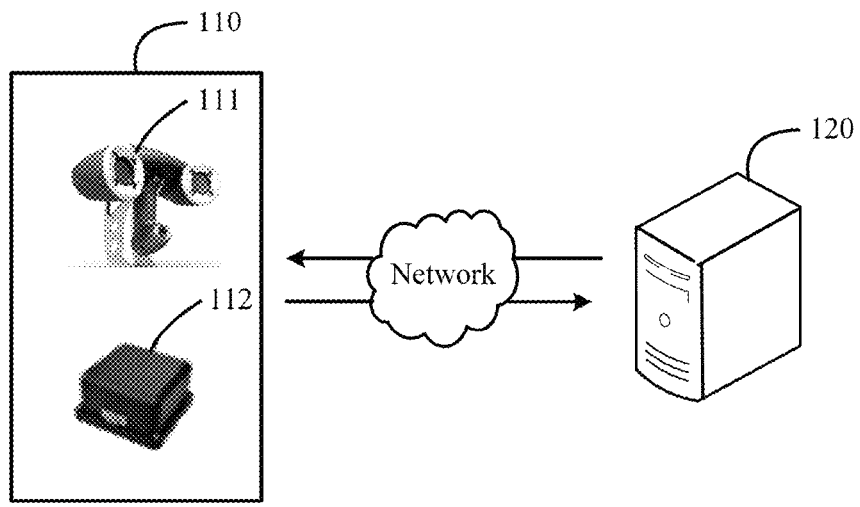
FIG. 1 is a schematic diagram of a scenario of a shoulder extraction method according to an embodiment of this application.

To resolve the foregoing technical problem, this application provides a shoulder extraction method and apparatus, so that the accuracy requirement of a high-accuracy map can be met. A specific scenario of the shoulder extraction method provided in this example of this application may be shown in FIG. 1. The application scenario includes a three-dimensional laser scanning system 110 and a server 120. The three-dimensional laser scanning system 110 communicates with the server 120 by using a network, which is, for example, a 3G or 4G network, and specific limitation is not made herein. A shoulder extraction apparatus provided in an example of this application may be implemented in the server 120.

The three-dimensional laser scanning system 110 may include a three-dimensional laser scanner 111 and a navigation system 112. The three-dimensional laser scanner 111 is an instrument that can provide three-dimensional point cloud data (or three-dimensional scan data) on a surface of a scanned object. The navigation system 112 is a system that obtains data of a global positioning system (GPS), may be an inertial navigation system, or the like, and may obtain geographical location data corresponding to each three-dimensional laser point in the three-dimensional point cloud data according to a correspondence between the three-dimensional laser point cloud data and the GPS data collected by the navigation system.

The three-dimensional laser scanning system 110 sends three-dimensional laser point cloud data of each frame and GPS data to the server 120 by using the network. The server 120 obtains the three-dimensional laser point cloud data of each frame, and removes a high spatial point in the three-dimensional laser point cloud data of each frame, to obtain a three-dimensional laser point cloud set of each frame, searches for a curvature mutation point (or curvature change point) and an elevation mutation point (or elevation change point) in the three-dimensional laser point cloud set of each frame, searches for a shoulder location point in the three-dimensional laser point cloud set of each frame according to the curvature mutation point and the elevation mutation point in the three-dimensional laser point cloud set of each frame, extracts the shoulder location point in the three-dimensional laser point cloud set of each frame by using a preset algorithm, connects extracted shoulder location points to obtain a shoulder line, and draws the shoulder line on a map according to geographical location data corresponding to three-dimensional laser points where the shoulder line is located.

Detailed descriptions are respectively provided below. It should be noted that the sequence numbers of the following examples do not limit the sequence of the examples.

EXAMPLE 1

Figure 2:
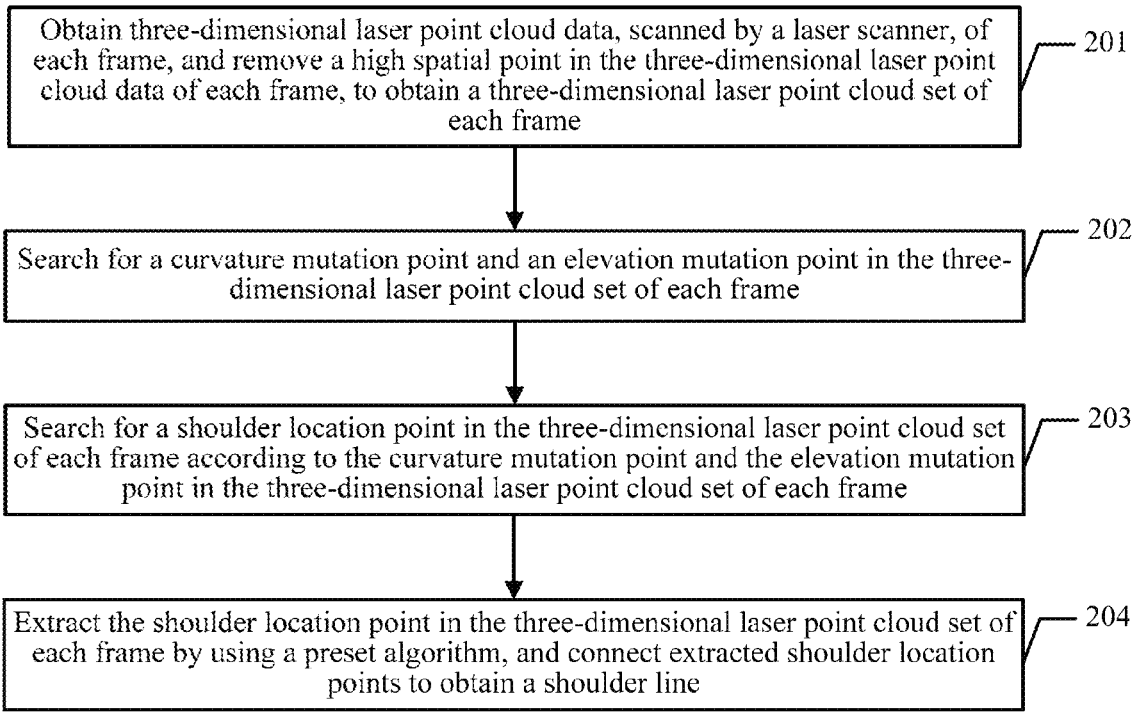
FIG. 2 is a schematic flowchart of a shoulder extraction method according to an embodiment of this application.

As shown in FIG. 2, the shoulder extraction method of this example includes the following steps:

Step 201: Obtain three-dimensional laser point cloud data, scanned by a laser scanner, of each frame, and remove a high spatial point in the three-dimensional laser point cloud data of each frame, to obtain a three-dimensional laser point cloud set of each frame.

In one implementation, the laser scanner may be a three-dimensional laser scanner, which can quickly reestablish a three-dimensional model and line, surface, volume and other various map data of a measured object by recording information such as three-dimensional coordinates, reflectivity, and texture of a large quantity of dense points on the surface of the measured object by using the principle of laser ranging. The three-dimensional laser scanner breaks through the conventional single point measurement method, and has unique advantages of high efficiency and high accuracy. The three-dimensional laser scanner can provide three-dimensional point cloud data on a surface of a scanned object, and therefore can be configured to obtain a high-accuracy and high-resolution digital terrain model.

The three-dimensional laser scanner uses a scanning manner of 360-degree rotary scanning. In this example, a point cloud obtained by rotary scanning from 0 degrees to 360 degrees by the laser scanner may be referred to as single-frame (one-frame) three-dimensional laser point cloud data. The three-dimensional laser point cloud data records three-dimensional coordinates that are of three-dimensional laser points and that are obtained after the laser scanner scans a road and a physical surface on the road. The three-dimensional laser scanner may scan to obtain a three-dimensional laser point cloud of each frame, and then send the three-dimensional laser point cloud of each frame to a server. The three-dimensional laser scanner may be mounted on a vehicle, and scans in a traveling process to obtain a three-dimensional laser point cloud. A vertical coordinate of three-dimensional laser point cloud is referred to as an elevation. Because an in-vehicle laser scanning system uses the collection manner of scanning along a road, the in-vehicle laser scanning system may quickly obtain point cloud information of fine buildings along two sides of a frontage road of an entire city, thereby providing basis for subsequent extraction and reestablishment of the buildings.

Because a high spatial point causes particular interference to extraction of a shoulder line, the high spatial point in the three-dimensional laser point cloud data of each frame may be removed to obtain a three-dimensional laser point cloud set of each frame. The high spatial point is a point having an elevation greater than a particular elevation threshold (such as 0.5 m). The elevation threshold may be self-defined according to actual requirements, to avoid interference caused by the high spatial point to the subsequent extraction of the shoulder line. That is, in this example of this application, points involved in extraction of the shoulder line are points having elevations less than the particular elevation threshold.

Step 202: Search for a curvature mutation point and an elevation mutation point in the three-dimensional laser point cloud set of each frame.

In one implementation, a method for searching for the curvature mutation point in the three-dimensional laser point cloud set of each frame may be as follows:

In the three-dimensional laser point cloud set of each frame, a lowest scanning point of the laser scanner is used as a start point (the laser scanner is mounted on the vehicle, which travels on the road, and the start point should be located on the road). According to angle information of a single-frame laser scanning data point, the lowest point of the laser scan is obtained as the start point, that is, an initial search point. Searching is performed along left and right sides starting from the start point, and a first point, found on each side and having a curvature value greater than a preset curvature threshold is used as the curvature mutation point.

A curvature value of each point may be a ratio $\nabla dz/\nabla dx$ of an elevation difference to a level difference of an nth point after the point and an nth point before the point, and n is an integer. The preset curvature threshold may be self-defined according to actual requirements. The nth point before the point and the nth point after the point may be determined according to a scanning sequence of the laser scanner.

A method for searching for the elevation mutation point in the three-dimensional laser point cloud set of each frame may be as follows:

Uniform meshing is performed on the three-dimensional laser point cloud set of each frame in a horizontal direction. The size of each grid may be the same. Each grid includes several points. An elevation difference $\nabla dz$ of the points in each grid is calculated. During calculation of the elevation difference, the elevation difference is obtained by subtracting the elevation of a point having a smallest elevation from the elevation of a point having a largest elevation in each grid. Then a lowest scanning point of the laser scanner is used as a start point, and searching is performed along left and right sides starting from a grid in which the start point is located. A first grid, found on each side and having an elevation difference greater than a preset elevation difference threshold (such as 0.2 m or 0.3 m) is determined. A point having a smallest elevation in the determined grid is used as the elevation mutation point. The preset elevation difference threshold may be self-defined according to actual requirements.

Step 203: Search for a shoulder location point in the three-dimensional laser point cloud set of each frame according to the curvature mutation point and the elevation mutation point in the three-dimensional laser point cloud set of each frame.

An accurate shoulder location point is searched for according to the curvature mutation point and the elevation mutation point that are determined in the foregoing step. For example, a point, closer to the start point, in the curvature mutation point and the elevation mutation point in the three-dimensional laser point cloud set of each frame may be first determined. The point, closer to the start point, in the curvature mutation point and the elevation mutation point is used as a new start point, and searching is performed within preset ranges of two sides of the new start point; and a point, found on each side and having a greatest curvature change is used as a shoulder location point in the three-dimensional laser point cloud set of each frame. A point having a largest curvature change is used as the shoulder location point, so that the determined shoulder location point is more accurate.

Usually, when a laser point is relatively close to a laser head, the curvature mutation point is relatively close to the initial search point. However, when the laser head is relatively far from the laser head, laser points emitted to a curb become sparse. In this case, instead, the elevation mutation point is relatively close to the initial search point.

Step 204: Extract the shoulder location point in the three-dimensional laser point cloud set of each frame by using a preset algorithm, and connect extracted shoulder location points to obtain a shoulder line.

The foregoing process of extracting the shoulder location point is inevitably subject to the effect of the ground object shield (such as pedestrians, plants, and vehicles). Consequently, an incorrect shoulder location point is obtained. In consideration of the spatial continuity of a shoulder in front and rear laser scanning line data frames, line extraction or curve extraction may be performed on shoulder location points in three-dimensional laser point cloud sets of successive m frames by using a preset algorithm. The preset algorithm, for example, is a random sample consensus (RANSAC) algorithm (an algorithm that calculates a mathematical model parameter of data according to a sampled data set including abnormal data, to obtain effective sampled data). For example, an RANSAC line extraction algorithm is used to remove and fit points having a straight-line distance greater than a threshold, and then sequentially connect various shoulder locations points on the extracted straight line according to the laser scanning sequence into a line, to form the shoulder line.

In this example, three-dimensional laser point cloud data, scanned by a laser scanner, of each frame is obtained; a high spatial point in the three-dimensional laser point cloud data of each frame is removed, to obtain a three-dimensional laser point cloud set of each frame; a curvature mutation point and an elevation mutation point in the three-dimensional laser point cloud set of each frame are searched for; a shoulder location point in the three-dimensional laser point cloud set of each frame is searched for according to the curvature mutation point and the elevation mutation point in the three-dimensional laser point cloud set of each frame; the shoulder location point in the three-dimensional laser point cloud set of each frame is extracted by using a preset algorithm; and extracted shoulder location points are connected to obtain a shoulder line. Therefore, the method of this application has the following advantages:

(1) The laser scanner uses an active light source, and therefore may not be affected by illumination;

(2) The curvature mutation point and the elevation mutation point are searched for by means of combining a curvature value with an elevation difference, so as to obtain the shoulder location point; in the entire process, automated extraction is performed, and the extraction efficiency is high;

(3) The three-dimensional laser point cloud data directly expresses three-dimensional coordinates of a real world; the shoulder location point is searched for according to the high-accuracy three-dimensional laser point cloud set, and line extraction is performed for automated extraction of a shoulder line, and the shoulder location point obtained by extraction in this way differs from a real shoulder location point merely on a centimeter level, so that the accuracy of the extracted shoulder data can be effectively ensured, thereby meeting the requirement of a high-accuracy map.

EXAMPLE 2

Figure 3A:
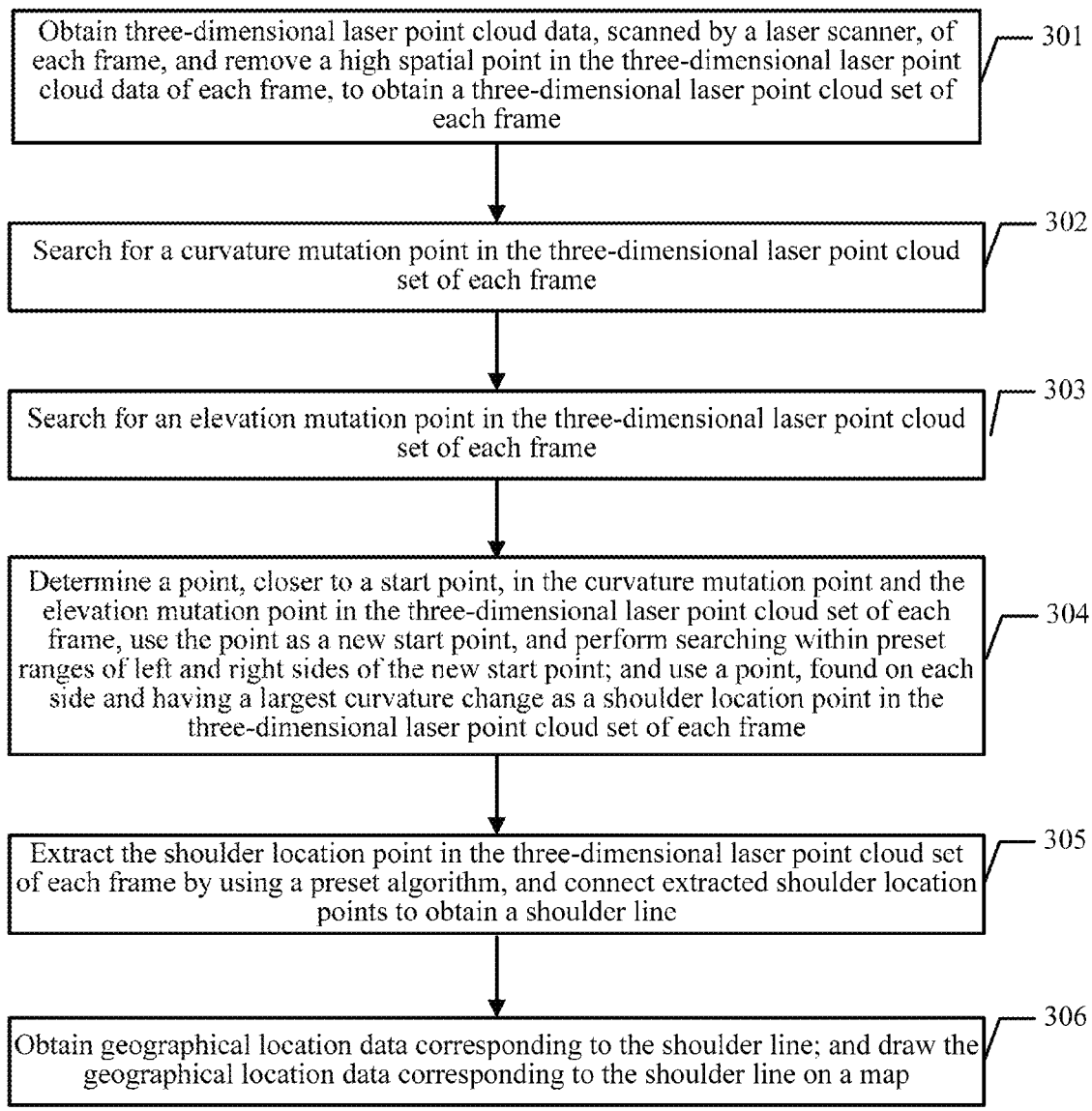
FIG. 3a is another schematic flowchart of a shoulder extraction method according to an embodiment of this application.
Figure 3B:
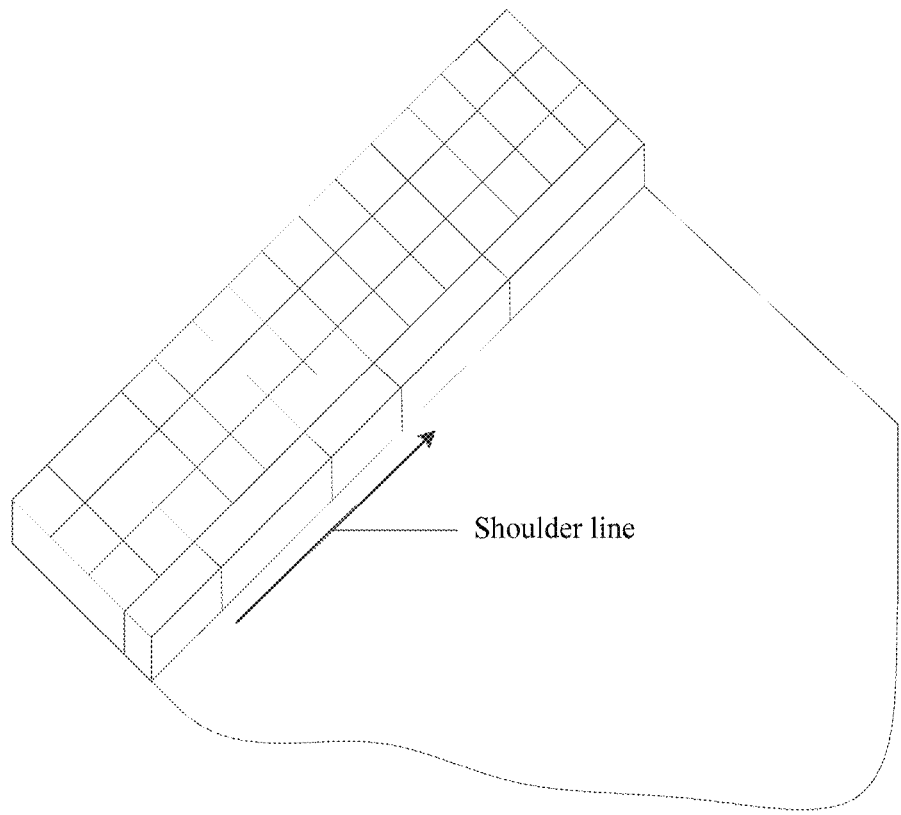
FIG. 3b is a schematic diagram of a location of a shoulder line according to an embodiment of this application.

The method described in Example 1 will be further described in detail in this example by using examples. In fact, the extracted shoulder line may be an upper edge line of a shoulder, or a lower edge line of the shoulder. In this example, extracting the lower edge line of the shoulder is used as an example for description. The extracted shoulder line may be shown as the arrow in FIG. 3b. The specific method of this example may be shown in FIG. 3a, and includes the following steps:

Step 301: Obtain three-dimensional laser point cloud data, scanned by a laser scanner, of each frame, and remove a high spatial point in the three-dimensional laser point cloud data of each frame, to obtain a three-dimensional laser point cloud set of each frame.

In one implementation, the laser scanner may be a three-dimensional laser scanner, which uses a scanning manner of 360-degree rotary scanning. In this example, a point cloud obtained by rotary scanning from 0 degrees to 360 degrees by the laser scanner may be referred to as single-frame (one-frame) three-dimensional laser point cloud data. The single-frame three-dimensional laser point cloud data may be shown in FIG. 3c, and includes building scanning points, shoulder scanning points, and road scanning points, and may also include scanning points of other objects. The three-dimensional laser point cloud data records three-dimensional coordinates that are of three-dimensional laser points and that are obtained after the laser scanner scans a road and a physical surface on the road. The three-dimensional laser scanner may scan to obtain a three-dimensional laser point cloud of each frame, and then send the three-dimensional laser point cloud of each frame to a server. The three-dimensional laser scanner may be mounted on a vehicle, and scans in a traveling process to obtain the three-dimensional laser point cloud. A vertical coordinate of the three-dimensional laser point cloud is referred to as an elevation. Because an in-vehicle laser scanning system uses the collection manner of scanning along a road, the in-vehicle laser scanning system may quickly obtain point cloud information of fine buildings along two sides of a frontage road of an entire city, thereby providing basis for subsequent extraction and reestablishment of the buildings.

After the three-dimensional laser point cloud data of each frame is obtained, the high spatial point in the three-dimensional laser point cloud data of each frame may be removed to obtain a three-dimensional laser point cloud set of each frame. The high spatial point is a point having an elevation greater than a particular elevation threshold (such as 0.5 m). The elevation threshold may be self-defined according to actual requirements, to avoid interference caused by the high spatial point to the subsequent extraction of the shoulder line. That is, in this example of this application, points involved in extraction of the shoulder line are points having elevations less than the particular elevation threshold.

Step 302: Search for a curvature mutation point in the three-dimensional laser point cloud set of each frame.

An exemplary search method is as follows:

In the three-dimensional laser point cloud set of each frame, a lowest scanning point (indicated in FIG. 3c) of the laser scanner is used as a start point (the laser scanner is mounted on the vehicle, which travels on the road, and the start point should be located on the road). Searching is performed along left and right sides, and a first point, found on each side and having a curvature value greater than a preset curvature threshold is used as the curvature mutation point. Curvature mutation points on the left and right sides may be shown as a point 1 and a point 2.

A curvature value of each point may be a ratio $\nabla dz/\nabla dx$ of an elevation difference to a level difference of an nth point after the point and an nth point before the point, and n is an integer. The preset curvature threshold may be self-defined according to actual requirements.

Step 303: Search for an elevation mutation point in the three-dimensional laser point cloud set of each frame.

For example, uniform meshing may be performed on the three-dimensional laser point cloud set of each frame in a horizontal direction. The size of each grid may be the same. Each grid includes several points. An elevation difference $\nabla dz$ of the points in each grid is calculated. During calculation of the elevation difference, the elevation difference is obtained by subtracting the elevation of a point having a smallest elevation from the elevation of a point having a largest elevation in each grid. Then a lowest scanning point of the laser scanner is used as a start point, and searching is performed along left and right sides starting from a grid in which the start point is located. A point having a smallest elevation in a first grid, found on each side and having an elevation difference greater than a preset elevation difference threshold (such as 0.2 m or 0.3 m) is used as the elevation mutation point. In this example, the elevation mutation point may be the same as the curvature mutation point, and is also shown as the point 1 and the point 2 in FIG. 3c. The preset elevation difference threshold may be self-defined according to actual requirements.

It should be noted that in this example, a lower edge point of the shoulder needs to be extracted, and therefore a point having a smallest elevation in a first grid, found on each side and having an elevation difference greater than a preset elevation difference threshold is used as the elevation mutation point. In fact, if an upper edge point of the shoulder needs to be extracted, a point having a largest elevation in the first grid, found on each side and having an elevation difference greater than the preset elevation difference threshold may be used as the elevation mutation point, and other algorithms are also correspondingly adjusted to algorithms for extracting an upper edge point of the shoulder.

Step 304: Determine a point, closer to a start point, in the curvature mutation point and the elevation mutation point in the three-dimensional laser point cloud set of each frame, use the point as a new start point, and perform searching within preset ranges of left and right sides of the new start point; and use a point, found on each side and having a largest curvature change as a shoulder location point in the three-dimensional laser point cloud set of each frame.

For example, a point, closer to the start point, in the curvature mutation point and the elevation mutation point in the three-dimensional laser point cloud set of each frame may be first determined. The point, closer to the start point, in the curvature mutation point and the elevation mutation point is used as a new start point, and searching is performed within preset ranges of two sides of the new start point; and a point, found on each side and having a greatest curvature change is used as a shoulder location point in the three-dimensional laser point cloud set of each frame.

Usually, when a laser point is relatively close to a laser head, the curvature mutation point is relatively close to the initial search point. However, when the laser head is relatively far from the laser head, laser points emitted to a curb become sparse. In this case, instead, the elevation mutation point is relatively close to the initial search point.

Figure 3C:
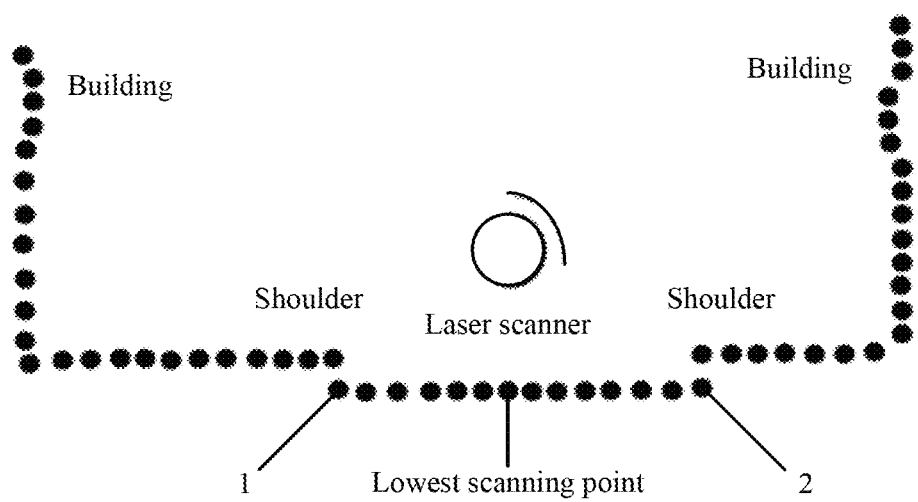
FIG. 3c is a schematic diagram of three-dimensional laser point cloud data according to an embodiment of this application.

In this example, the found elevation mutation point is the same as the curvature mutation point, and both are the point 1 and the point 2 in FIG. 3c. Therefore, the finally found shoulder location points are still the point 1 and the point 2 in FIG. 3c.

Step 305: Extract the shoulder location point in the three-dimensional laser point cloud set of each frame by using a preset algorithm, and connect extracted shoulder location points to obtain a shoulder line.

The foregoing process of extracting the shoulder location point is inevitably subject to the effect of the ground object shield (such as pedestrians, plants, and vehicles). Consequently, an incorrect shoulder location point is obtained. In consideration of the spatial continuity of a shoulder in front and rear laser scanning line data frames, line extraction or curve extraction may be performed on shoulder location points in three-dimensional laser point cloud sets of successive m frames by using a preset algorithm. The preset algorithm, for example, is an RANSAC line extraction algorithm, which is used to remove and fit points having a straight-line distance greater than a threshold, and then sequentially connect various shoulder locations points on the extracted straight line according to the laser scanning sequence into a line, to form the shoulder line.

Step 306: Obtain geographical location data corresponding to the shoulder line; and draw the geographical location data corresponding to the shoulder line on a map.

For example, geographical location data, such as longitude and latitude coordinates, corresponding to each three-dimensional laser point in a three-dimensional laser point cloud set is obtained according to a correspondence between three-dimensional laser point cloud data and GPS data that is collected by a navigation system. Longitude and latitude coordinates of shoulder location points on a straight line are obtained. The shoulder line is drawn on a map according to the longitude and latitude coordinates. The shoulder line drawn on the map may be used for automated vehicle operation.

In this example, three-dimensional laser point cloud data, scanned by a laser scanner, of each frame is obtained; a high spatial point in the three-dimensional laser point cloud data of each frame is removed, to obtain a three-dimensional laser point cloud set of each frame; a curvature mutation point and an elevation mutation point in the three-dimensional laser point cloud set of each frame are searched for; a shoulder location point in the three-dimensional laser point cloud set of each frame is searched for according to the curvature mutation point and the elevation mutation point in the three-dimensional laser point cloud set of each frame; the shoulder location point in the three-dimensional laser point cloud set of each frame is extracted by using a preset algorithm; and extracted shoulder location points are connected to obtain a shoulder line. Therefore, the method of this application has the following advantages:

(1) The laser scanner uses an active light source, and therefore may not be affected by illumination;

(2) The curvature mutation point and the elevation mutation point are searched for by means of combining a curvature value with an elevation difference, so as to obtain the shoulder location point; in the entire process, automated extraction is performed, and the extraction efficiency is high;

(3) The three-dimensional laser point cloud data directly expresses three-dimensional coordinates of a real world, and the shoulder location point obtained by extraction in this way differs from a real shoulder location point merely on a centimeter level, so that the accuracy of the extracted shoulder data can be effectively ensured, thereby meeting the requirement of a high-accuracy map.

EXAMPLE 3

Figure 4:
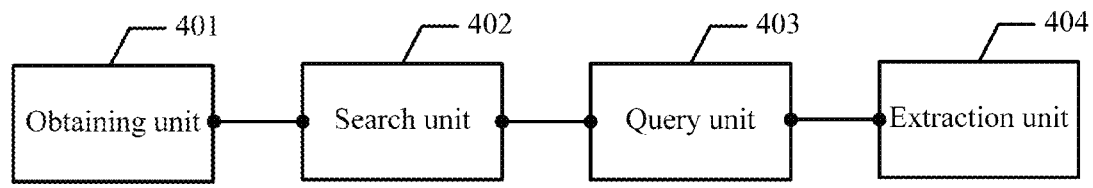
FIG. 4 is a schematic structural diagram of a shoulder extraction apparatus according to an embodiment of this application.

To better implement the foregoing method, an example of this application further provides a shoulder extraction apparatus. As shown in FIG. 4, the shoulder extraction apparatus of this example includes an obtaining unit 401, a search unit 402, a query unit 403, and an extraction unit 404 as follows:

(1) The obtaining unit 401:

The obtaining unit 401 is configured to obtain three-dimensional laser point cloud data, scanned by a laser scanner, of each frame, and remove a high spatial point in the three-dimensional laser point cloud data of each frame, to obtain a three-dimensional laser point cloud set of each frame.

In one implementation, the laser scanner may be a three-dimensional laser scanner, which can quickly reestablish a three-dimensional model and line, surface, volume and other various map data of a measured object by recording information such as three-dimensional coordinates, reflectivity, and texture of a large quantity of dense points on the surface of the measured object by using the principle of laser ranging. The three-dimensional laser scanner breaks through the conventional single point measurement method, and has unique advantages of high efficiency and high accuracy. The three-dimensional laser scanner can provide three-dimensional point cloud data on a surface of a scanned object, and therefore can be configured to obtain a high-accuracy and high-resolution digital terrain model.

The three-dimensional laser scanner uses a scanning manner of 360-degree rotary scanning. In this example, a point cloud obtained by rotary scanning from 0 degrees to 360 degrees by the laser scanner may be referred to as single-frame (one-frame) three-dimensional laser point cloud data. The three-dimensional laser point cloud data records three-dimensional coordinates that are of three-dimensional laser points and that are obtained after the laser scanner scans a road and a physical surface on the road. The three-dimensional laser scanner may scan to obtain a three-dimensional laser point cloud of each frame, and then send the three-dimensional laser point cloud of each frame to a server. The three-dimensional laser scanner may be mounted on a vehicle, and scans in a traveling process to obtain the three-dimensional laser point cloud. A vertical coordinate of the three-dimensional laser point cloud data is referred to as an elevation. Because an in-vehicle laser scanning system uses the collection manner of scanning along a road, the in-vehicle laser scanning system may quickly obtain point cloud information of fine buildings along two sides of a frontage road of an entire city, thereby providing basis for subsequent extraction and reestablishment of the buildings.

After the three-dimensional laser point cloud data of each frame is obtained, the high spatial point in the three-dimensional laser point cloud data of each frame may be removed to obtain a three-dimensional laser point cloud set of each frame. The high spatial point is a point having an elevation greater than a particular elevation threshold (such as 0.5 m). The elevation threshold may be self-defined according to actual requirements, to avoid interference caused by the high spatial point to the subsequent extraction of the shoulder line. That is, in this example of this application, points involved in extraction of the shoulder line are points having elevations less than the particular elevation threshold.

(2) The search unit 402:

The search unit 402 is configured to search for a curvature mutation point and an elevation mutation point in the three-dimensional laser point cloud set of each frame.

For example, the search unit 402 includes a curvature mutation point search unit and an elevation mutation point search unit. The curvature mutation point search unit is configured to use a lowest scanning point of the laser scanner as a start point (the laser scanner is mounted on the vehicle, which travels on the road, and the start point should be located on the road), perform searching along left and right sides, and use a first point, found on each side and having a curvature value greater than a preset curvature threshold as the curvature mutation point. The preset curvature threshold may be self-defined according to actual requirements. A curvature value of each point may be a ratio $\nabla dz/\nabla dx$ of an elevation difference to a level difference of an nth point after the point and an nth point before the point, and n is an integer. The elevation mutation point search unit is configured to perform meshing on the three-dimensional laser point cloud set of each frame in a horizontal direction. The size of each grid may be the same. Each grid includes several points. An elevation difference $\nabla dz$ of the points in each grid is calculated. During calculation of the elevation difference, the elevation difference is obtained by subtracting the elevation of a point having a smallest elevation from the elevation of a point having a largest elevation in each grid. Then a lowest scanning point of the laser scanner is used as a start point, and searching is performed along left and right sides starting from a grid in which the start point is located. A point having a smallest elevation in a first grid, found on each side and having an elevation difference greater than a preset elevation difference threshold is used as the elevation mutation point. The preset elevation difference threshold may be self-defined according to actual requirements.

(3) The query unit 403:

The query unit 403 is configured to search for a shoulder location point in the three-dimensional laser point cloud set of each frame according to the curvature mutation point and the elevation mutation point in the three-dimensional laser point cloud set of each frame.

For example, the query unit 403 includes a determining subunit and a query subunit. The determining subunit is configured to determine a point, closer to the start point, in the curvature mutation point and the elevation mutation point in the three-dimensional laser point cloud set of each frame. The query subunit is configured to use the point, closer to the start point, in the curvature mutation point and the elevation mutation point as a new start point, and perform searching within preset ranges of two sides of the new start point; and use a point, found on each side and having a largest curvature change as a shoulder location point in the three-dimensional laser point cloud set of each frame.

Usually, when a laser point is relatively close to a laser head, the curvature mutation point is relatively close to the initial search point. However, when the laser head is relatively far from the laser head, laser points emitted to a curb become sparse. In this case, instead, the elevation mutation point is relatively close to the initial search point.

(4) The extraction unit 404:

The extraction unit 404 is configured to extract the shoulder location point in the three-dimensional laser point cloud set of each frame by using a preset algorithm, and connect extracted shoulder location points to obtain a shoulder line.

For example, the preset algorithm, for example, is an RANSAC algorithm (an algorithm that calculates a mathematical model parameter of data according to a sampled data set including abnormal data, to obtain effective sampled data). The RANSAC algorithm may be used to perform line extraction or curve extraction on the shoulder location point in the three-dimensional laser point cloud set of each frame, remove and fit points having a straight-line distance greater than a threshold, and then sequentially connect various extracted shoulder locations points according to the laser scanning sequence into a line, to form the shoulder line.

Further, the shoulder extraction apparatus of this example may further include a drawing unit, which is configured to obtain geographical location data corresponding to the shoulder line, and draw the geographical location data corresponding to the shoulder line on a map.

For example, geographical location data, such as longitude and latitude coordinates, corresponding to each three-dimensional laser point in a three-dimensional laser point cloud set may be obtained according to a correspondence between three-dimensional laser point cloud data and GPS data that is collected by a navigation system. Longitude and latitude coordinates of shoulder location points on a shoulder line are obtained. The shoulder line is drawn on a map according to the longitude and latitude coordinates. The shoulder line drawn on the map may be used for automated vehicle operation.

It should be noted that the above functional modules are only described for exemplary purposes when the shoulder extraction apparatus provided in the foregoing example performs shoulder extraction. In some applications, the functions may be allocated to different functional modules according to needs, and this means that the internal structure of the device is divided to different functional modules to complete all or some of the above described functions. In addition, the shoulder extraction apparatus provided in the foregoing example is based on the same concept as the shoulder extraction method. For the exemplary implementation process, refer to the method example, and the details are not described herein again.

In this example, the obtaining unit obtains a three-dimensional laser point cloud data set, scanned by the laser scanner, of each frame; the search unit searches for a curvature mutation point and an elevation mutation point in the three-dimensional laser point cloud set of each frame; the query unit searches for a shoulder location point in the three-dimensional laser point cloud set of each frame according to the curvature mutation point and the elevation mutation point in the three-dimensional laser point cloud set of each frame; and the extraction unit performs line extraction on the shoulder location point in the three-dimensional laser point cloud set of each frame, and connects shoulder location points on an extracted straight line, to obtain a shoulder line. That is, in this example, the three-dimensional laser point cloud set, scanned by the laser scanner, of each frame is obtained; the laser scanner uses an active light source, and therefore is not affected by illumination; by performing searching in the high-accuracy three-dimensional laser point cloud set, and performing line extraction for automated extraction of a shoulder line, the accuracy of the extracted shoulder data can be effectively ensured, thereby meeting the requirement of a high-accuracy map. The extraction process does not need manual participation, and the extraction efficiency is high.

EXAMPLE 4

Figure 5:
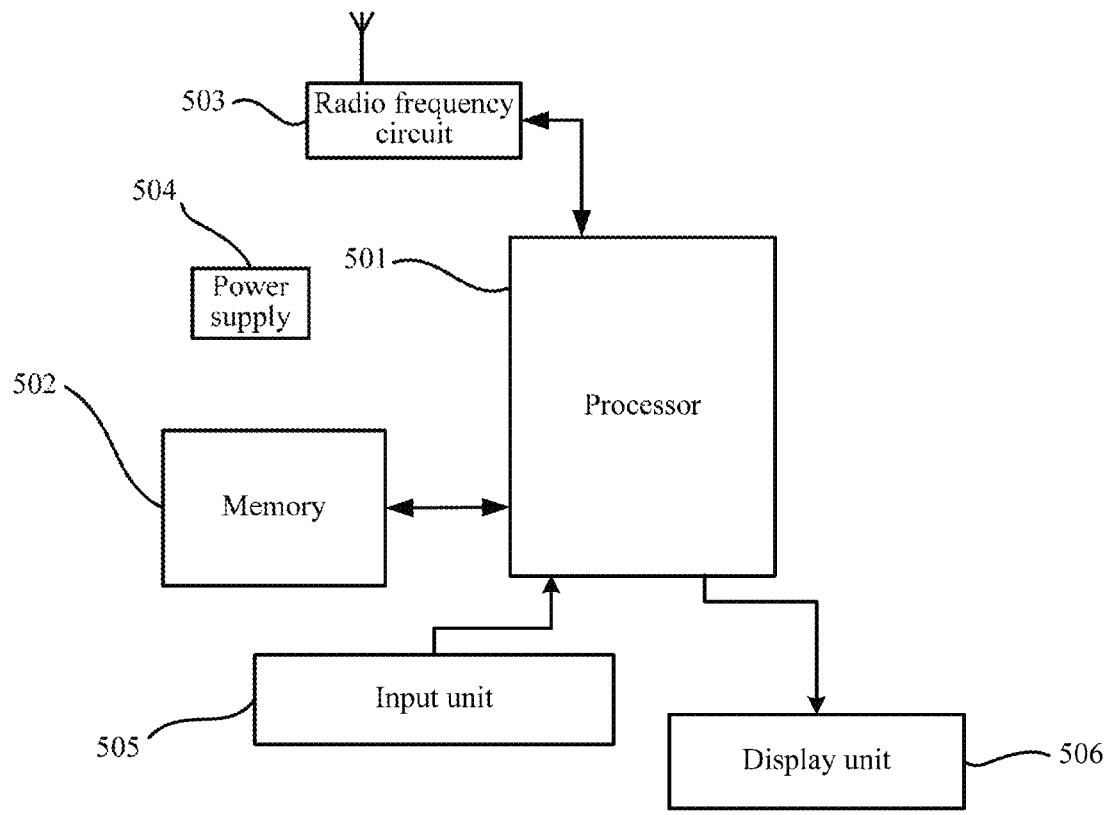
FIG. 5 is another schematic structural diagram of a shoulder extraction apparatus according to an embodiment of this application.

Another structure of a shoulder extraction apparatus of this example of this application is shown in FIG. 5, which shows a schematic structural diagram of the shoulder extraction apparatus involved in this example of this application.

The apparatus may include components such as a processor 501 including one or more processing cores, a memory 502 including one or more computer readable storage media, a radio frequency (RF) circuit 503, a power supply 504, an input unit 505, and a display unit 506. A person skilled in the art may understand that the structure of the apparatus shown in FIG. 5 does not constitute a limitation to the apparatus, and the apparatus may include more components or fewer components than those shown in the figure, or some components may be combined, or a different component deployment may be used.

The processor 501 is a control center of the apparatus, is connected to various parts of the entire apparatus by using various interfaces and lines, and by running or executing a software program and/or module stored in the memory 502 and calling data stored in the memory 502, performs various functions of the apparatus and processes data, so as to perform overall monitoring on the apparatus. Optionally, the processor 501 may include one or more processing cores. The processor 501 may integrate an application processor and a modem. The application processor mainly processes an operating system, a user interface, an application program, and the like. The modem mainly processes wireless communication. It may be understood that the foregoing modem may either not be integrated into the processor 501.

The memory 502 may be configured to store a software program and module. The processor 501 runs the software program and module stored in the memory 502, to implement various functional applications and data processing. The memory 502 may mainly include a program storage area and a data storage area. The program storage area may store an operating system, an application program required by at least one function (such as a sound playing function and an image display function), and the like. The data storage area may store data created according to use of the apparatus, and the like. In addition, the memory 502 may include a high speed random access memory, and may further include a non-volatile memory, such as at least one magnetic disk storage device, a flash memory, or other volatile solid-state storage devices. Correspondingly, the memory 502 may further include a memory controller, to provide access of the processor 501 to the memory 502.

The RF circuit 503 may be configured to receive and send signals during an information receiving and sending process. Particularly, the RF circuit 503 receives downlink information from a base station, then delivers the downlink information to the one or more processors 501 for processing, and sends related uplink data to the base station. Generally, the RF circuit 503 includes but is not limited to an antenna, at least one amplifier, a tuner, one or more oscillators, a subscriber identity module (SIM) card, a transceiver, a coupler, a low noise amplifier (LNA), a duplexer. In addition, the RF circuit 503 may also communicate with a network and another device by wireless communication. The wireless communication may use any communication standard or protocol, which includes, but is not limited to, Global System for Mobile Communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The apparatus further includes the power supply 504 (such as a battery) for supplying power to the components. The power supply 504 may be logically connected to the processor 501 by using a power management system, thereby implementing functions such as charging, discharging and power consumption management by using the power management system. The power supply 504 may further include any component, such as one or more direct current or alternate current power supplies, a re-charging system, a power supply fault detection circuit, a power supply converter or an inverter, and a power supply state indicator.

The apparatus may further include the input unit 505. The input unit 505 may be configured to receive entered numeric or character information and generate keyboard, mouse, joystick, optical, or trackball signal input related to user settings and function control. For example, the input unit 505 may include a touch-sensitive surface and another input device. The touch-sensitive surface, which may also be referred to as a touchscreen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 501. Moreover, the touch controller can receive and execute a command sent from the processor 501. In addition, the touch-sensitive surface may be implemented in multiple types, such as a resistive type, a capacitive type, an infrared type, and a surface acoustic wave type. In addition to the touch-sensitive surface, the input unit 505 may further include another input device. The another input device may include but is not limited to one or more of a physical keyboard, a function key (for example, a volume control key or a power on/off key), a trackball, a mouse, or a joystick.

The apparatus may further include the display unit 506. The display unit 506 may be configured to display information entered by the user or information provided to the user, and graphical user interfaces of the apparatus. The graphical user interfaces may each include an image, text, an icon, a video, or any combination thereof. The display unit 506 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 501 to determine the type of a touch event, and then the processor 501 provides corresponding visual output on the display panel according to the type of the touch event. Although, in FIG. 5, the touch-sensitive surface and the display panel are used as two separate parts to implement input and output functions, in some examples, the touch-sensitive surface and the display panel may be integrated to implement the input and output functions.

The apparatus may further include a camera, a Bluetooth module, and the like. Specifically, in this example, the processor 501 in the apparatus may load, according to the following instructions, executable files corresponding to processes of one or more application programs into the memory 502. The processor 501 runs the application programs stored in the memory 502, to implement various functions:

obtaining three-dimensional laser point cloud data, scanned by a laser scanner, of each frame, and removing a high spatial point in the three-dimensional laser point cloud data of each frame, to obtain a three-dimensional laser point cloud set of each frame;

searching for a curvature mutation point and an elevation mutation point in the three-dimensional laser point cloud set of each frame;

searching for a shoulder location point in the three-dimensional laser point cloud set of each frame according to the curvature mutation point and the elevation mutation point in the three-dimensional laser point cloud set of each frame;

extracting the shoulder location point in the three-dimensional laser point cloud set of each frame by using a preset algorithm, and connecting extracted shoulder location points to obtain a shoulder line.

Optionally, the three-dimensional laser point cloud data of each frame includes a point cloud obtained by rotary scanning from 0 degrees to 360 degrees by the laser scanner.

Optionally, the processor 501 may search for the curvature mutation point in the three-dimensional laser point cloud set of each frame in the following manner:

using a lowest scanning point of the laser scanner as a start point, and performing searching along left and right sides; and using a first point, found on each side and having a curvature value greater than a preset curvature threshold, as the curvature mutation point.

Optionally, a curvature value of each point is a ratio of an elevation difference to a level difference of an nth point after the point and an nth point before the point, and n is an integer.

Optionally, the processor 501 may search for the elevation mutation point in the three-dimensional laser point cloud set of each frame in the following manner:

performing meshing on the three-dimensional laser point cloud set of each frame in a horizontal direction;

calculating an elevation difference of points in each grid; and using a lowest scanning point of the laser scanner as a start point, and performing searching along left and right sides starting from a grid in which the start point is located; and using a point having a smallest elevation in a first grid, found on each side and having an elevation difference greater than a preset elevation difference threshold, as the elevation mutation point.

Optionally, the processor 501 may search for a shoulder location point in the three-dimensional laser point cloud set of each frame in the following manner:

determining a point, closer to the start point, in the curvature mutation point and the elevation mutation point in the three-dimensional laser point cloud set of each frame;

using the point, closer to the start point, in the curvature mutation point and the elevation mutation point as a new start point, and performing searching within preset ranges of two sides of the new start point; and using a point, found on each side and having a largest curvature change as a shoulder location point in the three-dimensional laser point cloud set of each frame.

Optionally, the processor 501 may further be configured to:

obtain geographical location data corresponding to the shoulder line; and draw the geographical location data corresponding to the shoulder line on a map.

For specific implementation of each of the foregoing operations, refer to the foregoing examples, and details are not described herein again.

As can be learned from the above, in this example, three-dimensional laser point cloud data, scanned by a laser scanner, of each frame is obtained; a high spatial point in the three-dimensional laser point cloud data of each frame is removed, to obtain a three-dimensional laser point cloud set of each frame; a curvature mutation point and an elevation mutation point in the three-dimensional laser point cloud set of each frame are searched for; a shoulder location point in the three-dimensional laser point cloud set of each frame is searched for according to the curvature mutation point and the elevation mutation point in the three-dimensional laser point cloud set of each frame; the shoulder location point in the three-dimensional laser point cloud set of each frame is extracted by using a preset algorithm; and extracted shoulder location points are connected to obtain a shoulder line. That is, in this example, the three-dimensional laser point cloud data, scanned by the laser scanner, of each frame is obtained; the laser scanner uses an active light source, and therefore is not affected by illumination; according to the high-accuracy three-dimensional laser point cloud set, by performing searching and line extraction, automated extraction of a shoulder line is performed, so that the accuracy of the extracted shoulder data can be effectively ensured, thereby meeting the requirement of a high-accuracy map. The extraction process does not need manual participation, and the extraction efficiency is high.

It should also be noted that the described apparatus example is merely exemplary. The units described as separate parts may or may not be physically separate, and parts displayed as units may or may not be physical units, may be located in one position, or may be distributed on a plurality of network units. Some or all of the units may be selected according to actual needs to achieve the objectives of the solutions of the examples. In addition, in the accompanying drawings of the apparatus examples provided in this application, connection relationships between units indicate that the units have communication connections with each other, which may be specifically implemented as one or more communications buses or signal cables.

Based on the foregoing descriptions of the implementations, a person skilled in the art may clearly learn that this application may be implemented by software in addition to necessary universal hardware or by dedicated hardware only, including a dedicated integrated circuit, a dedicated CPU, a dedicated memory, a dedicated component and the like. Generally, any functions that can be performed by a computer program can be implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application may be implemented in a form of a software product. The computer software product is stored in a computer-readable storage medium, for example, a floppy disk, a USB flash drive, a removable hard disk, a read-only memory (ROM), a random access memory (RAM), a magnetic disk, or an optical disc of a computer, and includes several instructions used to instruct a computer device (for example, a personal computer, a server, or a network device) to perform the methods according to the examples of this application.

A shoulder extraction method and apparatus provided in the examples of this application are described in detail above. The principle and implementations of this application are described herein by using specific examples. The descriptions of the foregoing examples are merely used for helping understand the method and core ideas of this application. In addition, a person skilled in the art can make variations in terms of the specific implementations and application scopes according to the ideas of this application.

In conclusion, the content of this specification shall not be construed as a limitation to this application.

What is claimed is:

1. A road shoulder extraction method, comprising:
   obtaining, by processing circuitry of a road shoulder extraction apparatus, three-dimensional scan data, generated by a laser scanner, of a plurality of frames;
   removing, by the processing circuitry, at least one high spatial point in the three-dimensional scan data of the plurality of frames, to obtain three-dimensional scan data sets of the plurality of frames;
   searching, by the processing circuitry, for a curvature change point and an elevation change point in the three-dimensional scan data set of each of the plurality of frames;
   searching, by the processing circuitry, for a road shoulder location point in the three-dimensional scan data set of each of the plurality of frames according to the curvature change point and the elevation change point in the three-dimensional scan data set of the respective frame;
   extracting, by the processing circuitry, the road shoulder location point in the three-dimensional scan data set of each of the plurality of frames according to a preset algorithm; and
   connecting, by the processing circuitry, the extracted road shoulder location points to obtain a road shoulder line, wherein
   the searching for the curvature change point includes
      setting, by the processing circuitry, a lowest scanning point of the laser scanner as a start point,
      performing, by the processing circuitry, searching along left and right sides of the start point, and
      setting, by the processing circuitry, a point, found on one of the left and right sides and having a curvature value greater than a preset curvature threshold, as the curvature change point in the three-dimensional scan data set; and
   the search for the road shoulder location point includes
      determining, by the processing circuitry, which of the curvature change point and the elevation change point in the three-dimensional scan data set of one of the plurality of frames is closer to the start point,
      setting, by the processing circuitry, the closer of the curvature change point and the elevation change point as a new start point,
      performing, by the processing circuitry, searching within preset ranges of two sides of the new start point, and
      setting, by the processing circuitry, a point having a largest curvature change as the road shoulder location point in the three-dimensional scan data set of the one of the plurality of frames.

2. The method according to claim 1, wherein the three-dimensional scan data of each of the plurality of frames is obtained from a 360 degree scan performed by the laser scanner.

3. The method according to claim 1, wherein the curvature value of the found point is a ratio of an elevation difference to a level difference of an nth point after the found point and an nth point before the found point, and n is an integer.

4. The method according to claim 1, wherein the searching for the elevation change point comprises:
   performing, by the processing circuitry, meshing on the one of the three-dimensional scan data set of each of the plurality of frames in a horizontal direction;
   calculating, by the processing circuitry, an elevation difference of points in at least one of a plurality of grids created by the meshing;
   performing, by the processing circuitry, searching along the left and right sides of the start point starting from a grid of the plurality of grids in which the start point is located; and
   setting, by the processing circuitry, a point having a smallest elevation in one of the plurality of grids and having an elevation difference greater than a preset elevation difference threshold, as the elevation change point in the three-dimensional scan data set.

5. The method according to claim 1, wherein the method further comprises:
   obtaining, by the processing circuitry, geographical location data corresponding to the road shoulder line; and
   drawing, by the processing circuitry, the geographical location data corresponding to the road shoulder line on a map.

6. The method according to claim 1, wherein the road shoulder line corresponds to an elevated shoulder of a road.

7. The method according to claim 1, wherein the three-dimensional scan data is of a surrounding environment of the laser scanner.

8. A road shoulder extraction apparatus, comprising:
   processing circuitry configured to
      obtain three-dimensional scan data, generated by a laser scanner, of a plurality of frames;
      remove at least one high spatial point in the three-dimensional scan data of the plurality of frames, to obtain three-dimensional scan data sets of the plurality of frames;
      search for a curvature change point and an elevation change point in the three-dimensional scan data set of each of the plurality of frames;
      search for a road shoulder location point in the three-dimensional scan data set of each of the plurality of frames according to the curvature change point and the elevation change point in the three-dimensional scan data set of the respective frame;
      extract the road shoulder location point in the three-dimensional scan data set of each of the plurality of frames according to a preset algorithm; and
      connect the extracted road shoulder location points to obtain a road shoulder line,
   wherein
   the processing circuitry is configured to
      set a lowest scanning point of the laser scanner as a start point, and perform searching along left and right sides of the start point in the three-dimensional scan data set for each of the plurality of frames,
      set a point, found on one of the left and right sides and having a curvature value greater than a preset curvature threshold, as the curvature change point in the three-dimensional scan data set,
      determine which of the curvature change point and the elevation change point in the three-dimensional scan data set of one of the plurality of frames is closer to the start point,
      set the closer of the curvature change point and the elevation change point as a new start point,
      perform searching within preset ranges of two sides of the new start point, and
      set a point having a largest curvature change as the road shoulder location point in the three-dimensional scan data set of the one of the plurality of frames.

9. The apparatus according to claim 8, wherein the three-dimensional scan data of each of the plurality of frames is obtained from a 360 degree scan performed by the laser scanner.

10. The apparatus according to claim 8, wherein the curvature value of the found point is a ratio of an elevation difference to a level difference of an nth point after the found point and an nth point before the found point, and n is an integer.

11. The apparatus according to claim 8, wherein the processing circuitry is configured to
perform meshing on the three-dimensional scan data set of each of the plurality of frames in a horizontal direction;
calculate an elevation difference of points in at least one of a plurality of grids created by the meshing;
perform searching along the left and right sides of the start point starting from a grid of the plurality of grids in which the start point is located; and
setting a point having a smallest elevation in one of the plurality of grids and having an elevation difference greater than a preset elevation difference threshold, as the elevation change point in the three-dimensional scan data set.

12. The apparatus according to claim 8, wherein the processing circuitry is configured to
obtain geographical location data corresponding to the road shoulder line; and
draw the geographical location data corresponding to the road shoulder line on a map.

13. The apparatus according to claim 8, wherein the road shoulder line corresponds to an elevated shoulder of a road.

14. The apparatus according to claim 8, wherein the three-dimensional scan data is of a surrounding environment of the laser scanner.

15. A non-transitory computer-readable storage medium storing instructions which when executed by at least one processor cause the at least one processor to perform:
obtaining three-dimensional scan data, generated by a laser scanner, of a plurality of frames;
removing at least one high spatial point in the three-dimensional scan data of the plurality of frames, to obtain three-dimensional scan data sets of the plurality of frames;
searching for a curvature change point and an elevation change point in the three-dimensional scan data set of each of the plurality of frames;
searching for a road shoulder location point in the three-dimensional scan data set of each of the plurality of frames according to the curvature change point and the elevation change point in the three-dimensional scan data set of the respective frame;
extracting the road shoulder location point in the three-dimensional scan data set of each of the plurality of frames according to a preset algorithm; and
connecting the extracted road shoulder location points to obtain a road shoulder line,
wherein
the searching for the curvature change point includes
setting a lowest scanning point of the laser scanner as a start point,
performing searching along left and right sides of the start point, and
setting a point, found on one of the left and right sides and having a curvature value greater than a preset curvature threshold, as the curvature change point in the three-dimensional scan data set; and
the searching for the road shoulder location point includes
determining which of the curvature change point and the elevation change point in the three-dimensional scan data set of one of the plurality of frames is closer to the start point,
setting the closer of the curvature change point and the elevation change point as a new start point,
performing searching within preset ranges of two sides of the new start point, and
setting a point having a largest curvature change as the road shoulder location point in the three-dimensional scan data set of the one of the plurality of frames.

16. The non-transitory computer-readable storage medium according to claim 15, wherein the road shoulder line corresponds to an elevated shoulder of a road.

* * * * *